US009143455B1

(12) United States Patent
Hughes

(10) Patent No.: US 9,143,455 B1
(45) Date of Patent: *Sep. 22, 2015

(54) QUALITY OF SERVICE USING MULTIPLE FLOWS

(71) Applicant: Silver Peak Systems, Inc., Santa Clara, CA (US)

(72) Inventor: David Anthony Hughes, Los Altos Hills, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/248,188

(22) Filed: Apr. 8, 2014

Related U.S. Application Data

(63) Continuation of application No. 12/217,440, filed on Jul. 3, 2008, now Pat. No. 8,743,683.

(51) Int. Cl.
*H04L 12/26* (2006.01)
*H04L 12/851* (2013.01)

(52) U.S. Cl.
CPC ...................................... *H04L 47/24* (2013.01)

(58) Field of Classification Search
USPC ......... 370/216, 225, 229, 230, 231, 235, 236, 370/241, 248, 252, 254, 255, 256
See application file for complete search history.

(56) References Cited

U.S. PATENT DOCUMENTS

| | | | |
|---|---|---|---|
| 4,494,108 A | 1/1985 | Langdon, Jr. et al. | |
| 4,612,532 A | 9/1986 | Bacon et al. | |
| 5,023,611 A | 6/1991 | Chamzas et al. | |
| 5,243,341 A | 9/1993 | Seroussi et al. | |
| 5,307,413 A | 4/1994 | Denzer | |
| 5,357,250 A | 10/1994 | Healey et al. | |
| 5,359,720 A | 10/1994 | Tamura et al. | |
| 5,373,290 A | 12/1994 | Lempel et al. | |
| 5,483,556 A | 1/1996 | Pillan et al. | |
| 5,532,693 A | 7/1996 | Winters et al. | |

(Continued)

FOREIGN PATENT DOCUMENTS

EP 1507353 2/2005

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14 pages.

(Continued)

*Primary Examiner* — Michael Thier
*Assistant Examiner* — Feben M Haile
(74) *Attorney, Agent, or Firm* — Carr & Ferrell LLP

(57) ABSTRACT

A method, system, and computer program are provided for quality of service using multiple flows. At a first digital device, a plurality of inter-computer flows is established between the first digital device and a computer. A plurality of inter-device flows is also established between the first digital device and a second digital device via a communication network. At least one flow metric associated with each of the inter-device flows is determined, which may include, for example, a latency metric, a loss metric, and/or a re-ordering metric. According to various embodiments, flow metrics may form a basis for categorizing the inter-device flows. One or more preferred flows are selected based on the flow metrics. Finally, a packet to be sent to the second device is directed to one of the preferred flows.

14 Claims, 10 Drawing Sheets

(56) References Cited

U.S. PATENT DOCUMENTS

| | | |
|---|---|---|
| 5,592,613 A | 1/1997 | Miyazawa et al. |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Williams et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel, III et al. |
| 6,054,943 A | 4/2000 | Lawrence |
| 6,081,883 A | 6/2000 | Popelka et al. |
| 6,175,944 B1 | 1/2001 | Urbanke et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,662 B1 | 8/2002 | Greene et al. |
| 6,438,664 B1 | 8/2002 | McGrath et al. |
| 6,452,915 B1 | 9/2002 | Jorgensen |
| 6,489,902 B2 | 12/2002 | Heath |
| 6,587,985 B1 | 7/2003 | Fukushima et al. |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,738,379 B1 | 5/2004 | Balazinski et al. |
| 6,769,048 B2 | 7/2004 | Goldberg et al. |
| 6,791,945 B1 | 9/2004 | Levenson et al. |
| 6,856,651 B2 | 2/2005 | Singh |
| 6,859,842 B1 | 2/2005 | Nakamichi et al. |
| 6,910,106 B2 | 6/2005 | Sechrest et al. |
| 6,968,374 B2 * | 11/2005 | Lemieux et al. ............. 709/223 |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,047,281 B1 | 5/2006 | Kausik |
| 7,069,342 B1 | 6/2006 | Biederman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,197,597 B1 | 3/2007 | Scheid et al. |
| 7,200,847 B2 | 4/2007 | Straube et al. |
| 7,215,667 B1 | 5/2007 | Davis |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie, III et al. |
| 7,389,393 B1 | 6/2008 | Karr et al. |
| 7,417,570 B2 | 8/2008 | Srinivasan et al. |
| 7,417,991 B1 * | 8/2008 | Crawford et al. ............. 370/394 |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,619,545 B2 | 11/2009 | Samuels et al. |
| 7,620,870 B2 | 11/2009 | Srinivasan et al. |
| 7,624,446 B1 | 11/2009 | Wilhelm |
| 7,630,295 B2 | 12/2009 | Hughes et al. |
| 7,639,700 B1 | 12/2009 | Nabhan et al. |
| 7,643,426 B1 * | 1/2010 | Lee et al. ............. 370/238 |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,970,898 B2 | 6/2011 | Clubb et al. |
| 8,069,225 B2 | 11/2011 | McCanne et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,392,684 B2 | 3/2013 | Hughes |
| 8,442,052 B1 | 5/2013 | Hughes |
| 8,473,714 B2 | 6/2013 | Hughes et al. |
| 8,489,562 B1 | 7/2013 | Hughes et al. |
| 8,565,118 B2 | 10/2013 | Shukla et al. |
| 8,595,314 B1 | 11/2013 | Hughes |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,811,431 B2 | 8/2014 | Hughes |
| 8,929,380 B1 | 1/2015 | Hughes et al. |
| 8,929,402 B1 | 1/2015 | Hughes |
| 8,930,650 B1 | 1/2015 | Hughes et al. |
| 2001/0054084 A1 | 12/2001 | Kosmynin |
| 2002/0007413 A1 | 1/2002 | Garcia-Luna-Aceves et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0131434 A1 | 9/2002 | Vukovic et al. |
| 2002/0150041 A1 * | 10/2002 | Reinshmidt et al. ......... 370/216 |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0123481 A1 | 7/2003 | Neale et al. |
| 2003/0133568 A1 | 7/2003 | Stein et al. |
| 2003/0142658 A1 | 7/2003 | Ofuji et al. |

(56) References Cited

U.S. PATENT DOCUMENTS

| | | |
|---|---|---|
| 2003/0149661 A1 | 8/2003 | Mitchell et al. |
| 2003/0149869 A1 | 8/2003 | Gleichauf |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0179542 A1 | 9/2004 | Murakami et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0235119 A1 | 10/2005 | Sechrest et al. |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0174428 A1 | 7/2007 | Lev Ran et al. |
| 2007/0195702 A1 | 8/2007 | Yuen et al. |
| 2007/0198523 A1 | 8/2007 | Hayim |
| 2007/0226320 A1 | 9/2007 | Hager et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1* | 12/2007 | Rosberg .................. 370/392 |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0095060 A1 | 4/2008 | Yao |
| 2008/0133536 A1 | 6/2008 | Bjorner et al. |
| 2008/0184081 A1 | 7/2008 | Hama et al. |
| 2008/0205445 A1 | 8/2008 | Kumar et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0313318 A1 | 12/2008 | Vermeulen et al. |
| 2008/0320151 A1 | 12/2008 | McCanne et al. |
| 2009/0024763 A1 | 1/2009 | Stepin et al. |
| 2009/0060198 A1 | 3/2009 | Little |
| 2009/0063696 A1 | 3/2009 | Wang et al. |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0234966 A1 | 9/2009 | Samuels et al. |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0225658 A1 | 9/2010 | Coleman |
| 2010/0290364 A1 | 11/2010 | Black |
| 2010/0318892 A1 | 12/2010 | Teevan et al. |
| 2011/0002346 A1 | 1/2011 | Wu |
| 2011/0022812 A1 | 1/2011 | van der Linden et al. |
| 2011/0154329 A1 | 6/2011 | Arcese et al. |
| 2011/0219181 A1 | 9/2011 | Hughes et al. |
| 2011/0276963 A1 | 11/2011 | Wu et al. |
| 2012/0036325 A1 | 2/2012 | Mashtizadeh et al. |
| 2012/0173759 A1 | 7/2012 | Agarwal et al. |
| 2012/0221611 A1 | 8/2012 | Watanabe et al. |
| 2012/0239872 A1 | 9/2012 | Hughes et al. |
| 2013/0044751 A1 | 2/2013 | Casado et al. |
| 2013/0080619 A1 | 3/2013 | Assuncao et al. |
| 2013/0086236 A1 | 4/2013 | Baucke et al. |
| 2013/0094501 A1 | 4/2013 | Hughes |
| 2013/0117494 A1 | 5/2013 | Hughes et al. |
| 2013/0121209 A1 | 5/2013 | Padmanabhan et al. |
| 2013/0263125 A1 | 10/2013 | Shamsee et al. |
| 2013/0282970 A1 | 10/2013 | Hughes et al. |
| 2014/0052864 A1 | 2/2014 | Van Der Linden et al. |
| 2014/0123213 A1 | 5/2014 | Vank et al. |
| 2014/0181381 A1 | 6/2014 | Hughes et al. |
| 2014/0379937 A1 | 12/2014 | Hughes et al. |

OTHER PUBLICATIONS

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, <http://www.lancache.com/slcdata.htm>.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

(56) References Cited

OTHER PUBLICATIONS

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.

Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.

Knutsson, Bjorn et al., "Transparent Proxy Signalling", Journal of Communications and Networks, vol. 3, No. 2, Jun. 2001.

definition memory (n), Webster'S Third New International Dictionary, Unabridged (1993), available at <http://lionreference.chadwyck.com>(Dictionaries/Webster's Dictionary).

Definition appliance, 2c, Webster's Third New International Dictionary, Unabridged (1993), available at <http://lionreference.chadwyck.com>(Dictionaries/Webster's Dictionary).

Newton, "Newton's Telecom Dictionary", 17th Ed., 2001, pp. 38, 201, and 714.

Silver Peak Systems, "The Benefits of Byte-level WAN Deduplication"(2008).

Final Written Decision, Dec. 30, 2014, Inter Partes Review Case No. IPR2013-00403.

Final Written Decision, Dec. 30, 2014, Inter Partes Review Case No. IPR2013-00402.

* cited by examiner

QUALITY OF SERVICE USING MULTIPLE FLOWS

CROSS-REFERENCE TO RELATED APPLICATIONS

This nonprovisional U.S. patent application is a continuation of, and claims the priority benefit of, U.S. patent application Ser. No. 12/217,440 filed Jul. 3, 2008 and entitled "Quality of Service Using Multiple Flows," which is hereby incorporated by reference in its entirety.

BACKGROUND

1. Technical Field

The present invention generally relates to quality of service in communication networks. More specifically, the present invention relates to quality of service using multiple flows.

2. Description of Related Art

Conventionally, quality of service (QoS) refers to resource reservation control mechanisms in a communication network. Quality of service describes an ability to assign different performance levels to packets. The performance levels or priorities may be associated with certain applications, users, etc. Certain performance levels may be guaranteed for a particular flow, such as bit rate, delay, jitter, packet dropping probability, and/or bit error rate. Guaranteed performance levels may be quite important in delay sensitive applications, such as voice over internet protocol (VoIP), especially when communication network capacity is insufficient.

For IP networks, two broad approaches have been developed to implement quality of service. In the first approach, known as integrated services or "IntServ," applications that require performance guarantees make individual reservations for communication network resources. Disadvantageously, routers in the communication network accept, maintain, and tear down the individual reservations, which hinders scalability of IntServ.

The second approach to implementing quality of service is known as differentiated services or "DiffServ." In DiffServ, packets are marked according to certain performance requirements. In response, routers and switches within the communication network use various queuing strategies to tailor performance to the performance requirements. While IntServ lacks scalability, quality of service with DiffServ operates on aggregates of many flows, leaving ultimate decisions regarding flow assignments to third-parties.

Routing can also be based on quality of service. Certain routing protocols, such as a border gateway protocol (BGP), make routing decisions based on path, network policies, and/or rule sets in accordance with quality of service designations of the packets. This approach does not allow every possible path to be taken advantage of. Furthermore, users of the network may have no control over which path a given packet follows beyond choosing which service provider to send the packet.

SUMMARY OF THE INVENTION

A method, system, and computer program are provided for quality of service using multiple flows. At a first digital device, a plurality of inter-computer flows is established between the first digital device and a computer. A plurality of inter-device flows is also established between the first digital device and a second digital device via a communication network. At least one flow metric associated with each of the inter-device flows is determined. The flow metric may include, for example, a latency metric, a loss metric, and/or a re-ordering metric. According to various embodiments, flow metrics may form a basis for categorizing the inter-device flows. Subsequently, one or more preferred flows are selected based on the flow metrics. Finally, a packet to be sent to the second device is directed to one of the preferred flows.

DETAILED DESCRIPTION

Embodiments of the present invention provide quality of service such that data is directed to various flows independent of protocols associated with a communication network. According to various embodiments, this may be achieved using multiple flows. As discussed in greater detail herein, multiple flows may be established between two or more computers via the communication network to transfer packets comprising data. The flows may be categorized based on various flow metrics. These flow metrics may be related to, for example, latency, re-ordering, and/or loss of packets. The packets may be directed to flows having preferable flow metrics without any specific knowledge or concern of the communication network, protocols, or computers thereof.

Figure 1:
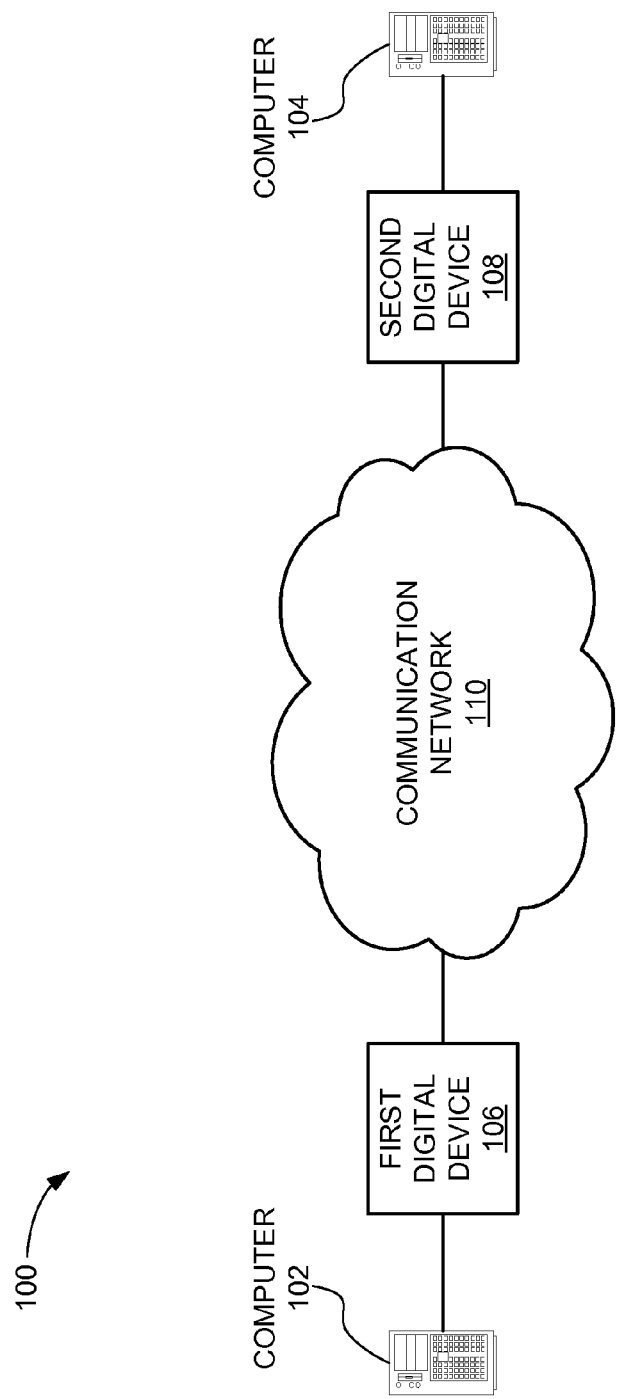
FIG. 1 illustrates an exemplary environment for implementing quality of service using multiple flows.

FIG. 1 illustrates an exemplary environment 100 for implementing quality of service using multiple flows. The environment 100 may comprise computers 102 and 104, a first digital device 106, a second digital device 108, and a communication network 110. The computer 102 may be in communication with the computer 104 via the communication network 110. The first and second digital devices 106 and 108, respectively, may be arranged in-path or out-of-path (not shown), in various embodiments. Furthermore, it is noted that the first digital device 106 may be equivalent to, and interchangeable with, the second digital device 108 in that any task or procedure carried out by the first digital device 106 may be similarly carried out by the second digital device 108, and vice versa.

According to various embodiments, the environment 100 may further comprise servers, routers, switches, and other communication network components. Although two digital devices are depicted in FIG. 1 (i.e., the first digital device 106 and the second digital device 108), the principles discussed herein are equally applicable to environments that include any number of the digital devices. However, for the sake of simplicity, embodiments involving the first digital device 106 and the second digital device 108 are described herein.

The computers 102 and/or 104 may comprise, for example, a server, a desktop personal computer (PC), a laptop PC, a pocket PC, a personal digital assistant (PDA), or other computing devices. In some embodiments, the computers 102 and/or 104 may be substituted by a plurality of computers. In one embodiment, the plurality of computers may be located at one physical locale and be in communication with one or more of the digital devices (e.g., the first digital device 106 and the second digital device 108) at the same physical locale. The computer (e.g., the computer 102 or the computer 104) may, according to various embodiments, be integrated with the digital device (e.g., the first digital device 106 or the second digital device 108) as a single system. The first and second digital devices 106 and 108, respectively, are discussed in further detail herein.

The communication network 110 may comprise hardware and/or software elements that enable the exchange of information (e.g., voice, data, flows, packets, etc.) between the computer 102 and the computer 104. Some examples of the communication network 110 include a local area communication network (LAN), a wide area communication network (WAN), an intranet, the Internet, and any combination thereof.

Figure 2:
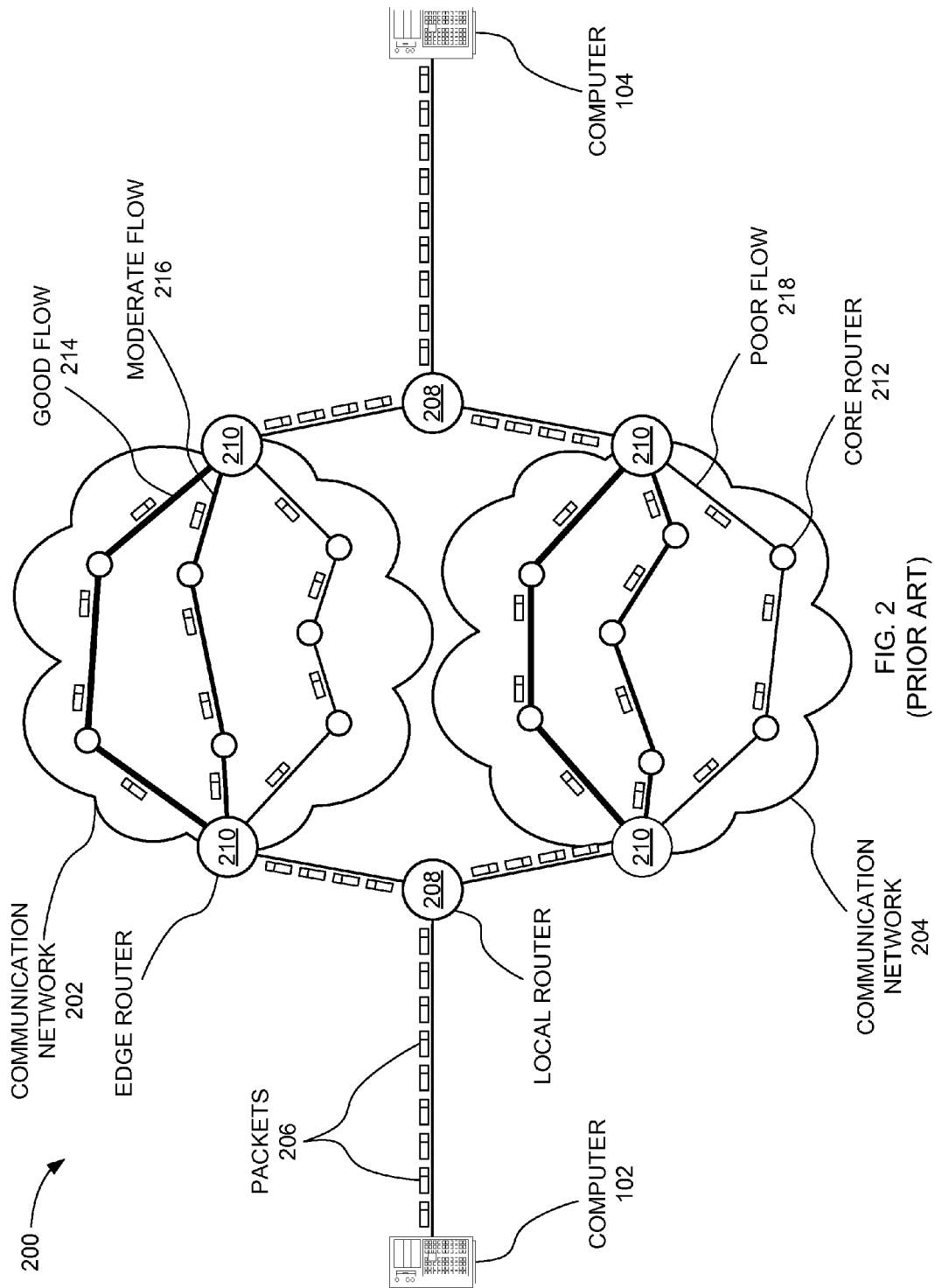
FIG. 2 shows an environment for transferring data, according to prior art.

FIG. 2 shows an environment 200 for transferring data, according to prior art. The environment 200 includes two communication networks (i.e., communication network 202 and communication network 204) over which packets 206 are transferred between the computer 102 and the computer 104. The packets 206 may comprise a data portion and a header portion. Packets are discussed further in connection with FIG. 9A. The communication network 110 may comprise the communication network 202 and the communication network 204. The environment 200 is depicted as comprising two communication networks, but may comprise any number of communication networks in practice. The communication network 202 and the communication network 204 may, for example, represent communication networks that are provided by different service providers.

As depicted in FIG. 2, the computers 102 and 104 may each be in communication with a local router 208. The local routers 208, in turn, are coupled to one or more edge routers 210. The edge routers 210 are in communication with core routers 212 that direct packets within the communication networks (e.g., the communication network 202 and the communication network 204).

As one skilled in the art will recognize, each of the packets 206 belongs to a flow. The flows may be identified, for example, by a combination of source and destination computer IP addresses or source and destination TCP ports. These flows are referred to, herein, as "inter-computer flows." In turn, packets of each flow travel on one or more paths between the computers 102 and 104.

The computers 102 and 104 may have no control over which paths the packets 206 are directed to in the environment 200 outside of the quality of service approaches described in the prior art. As alluded to herein, a general result of transferring packets in an environment, such as the environment 200, is that performance and priority of the transmission are ultimately determined by a third-party. Data paths between the core routers 212 are determined based on various communication network protocols. The data paths may carry flows of varying quality, such as a good flow 214, a moderate flow 216, or a poor flow 218. Quality of a given flow may be determined by certain flow metrics. As mentioned herein, the flow metrics may include latency, re-ordering, and/or loss of packets, and may be referred to as a latency metric, a re-ordering metric, and a loss metric, respectively.

The latency metric may simply be described as a time required for the packet to reach a destination. In some cases, the latency metric may be related to round-trip time or RTT. Many different communication network delays may comprise the latency metric. For example, a processing delay is time taken by various routers (e.g., the local router 208, the edge router 210, and the core router 212) to process the header of the packet. A queuing delay may be time that the packet spends in routing queues. Time required to push the packet into a physical link connecting the various routers may be referred to as a transmission delay. Lastly, a propagation delay is time required for a signal comprising the packet to propagate through a medium (e.g., a wire, a cable, or air) used to transmit the packet.

The re-ordering metric determines a level of re-ordering of the packets that is required upon arrival of the packets at the destination, in exemplary embodiments. To illustrate, when a plurality of related packets are transmitted across the communication network(s), different packets may be directed to different paths. This may be due to packets from a single flow being directed to more than one path, for example. The plurality of related packets may resultantly arrive at the destination in a different order than as sent. Thus, the plurality of related packets may require re-ordering. The re-ordering metric may have a dramatic impact, for example, on VoIP and video data streams.

The loss metric quantifies packet loss, which occurs when one or more packets being transmitted across the communication network fail to reach the destination. Packet loss may be caused by a number of factors, such as signal degradation, oversaturation of the communication network, corrupted packets being rejected in-transit, faulty communication networking hardware, and maligned system drivers or communication network applications. The loss metric may also take into account bit error and/or spurious packets. Although the latency metric, the re-ordering metric, and the loss metric are described herein, other metrics may comprise the flow metrics and still fall within the scope of the present invention.

Figure 3:
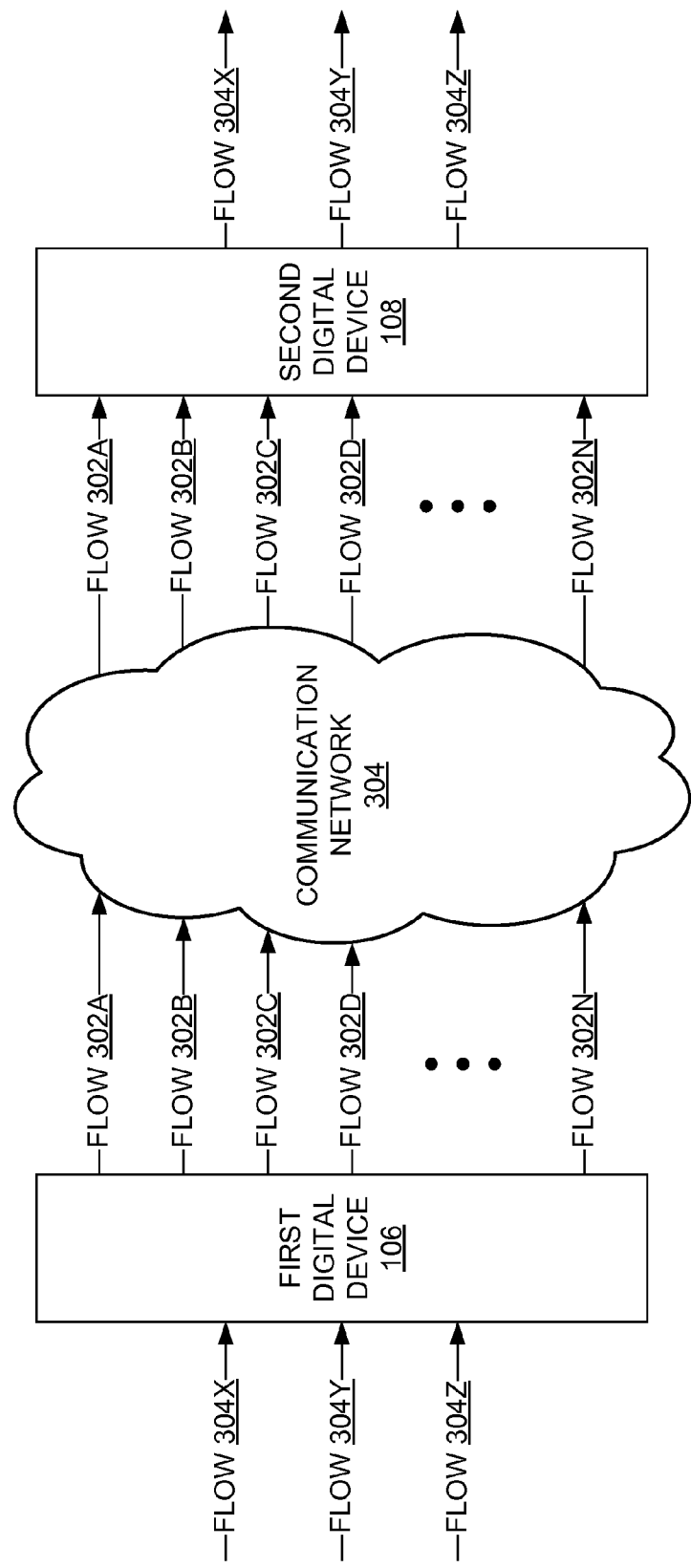
FIG. 3 illustrates a plurality of inter-device flows established between two digital devices via a communication network, according to various embodiments.

FIG. 3 illustrates a plurality of inter-device flows (i.e., flows 302A-302N) established between the digital devices 106 and 108 via a communication network 304, according to various embodiments. As discussed in connection with FIG. 1, the digital devices 106 and 108 may be in communication with various computers (e.g., the computers 102 and 104) or be integrated with the computers. In either case, the digital devices 106 and 108 intersect the inter-computer flows (i.e., flows 304X-304Z) originating, for example, at the computers 102 and 104. From the perspective of the computers 102 and 104, the inter-computer flows remain completely intact, according to exemplary embodiments. Data being transferred via the inter-computer flows may be reassigned or directed to the inter-device flows by the digital devices 106 and 108, as described in further detail herein.

The communication network 304 may comprise, or be similar to, the communication networks 110, 202, and/or 204. However, details of what actually comprises the communication network 304 may be inconsequential with respect to the present invention. More specifically, the digital devices 106 and 108 may be oblivious to what actually exists between them and may only be concerned with the flows (i.e., the flows 302A-302N and the flows 304X-304Z), themselves. As such, the digital devices 106 and 108 may override some or all third-party influence from the performance and priorities associated with transferring packets across the communication network 304. The flows 302A-302N may be classified based on the flow metrics; the determination of which is discussed in connection with FIG. 6 and FIG. 7.

Classifying the flows 302A-302N based on the flow metrics may aid the digital devices 106 and 108 in determining which packets should be directed to which inter-device flows. For example, the inter-device flows may be grouped into three classifications. A first classification may be associated with inter-device flows having preferable flow metrics, which exhibit excellent performance in transferring the packets. The first classification may be reserved for packets having highest priorities. A second classification may be ascribed to inter-device flows having slightly less preferable flow metrics, relative to the first classification, but nevertheless acceptable. Packets that must be transferred, but that are, for various reasons, less essential, may be directed to the inter-device flows having the second classification. Poorly performing inter-device flows, having less than desirable flow metrics, may be used only sparingly. However, in one example, at least some packets may be directed to each inter-device flow in order to determine the flow metrics. Further examples describing classifying the inter-device flows and directing packets to the inter-device flows are discussed in connection with FIG. 8.

Figure 4:
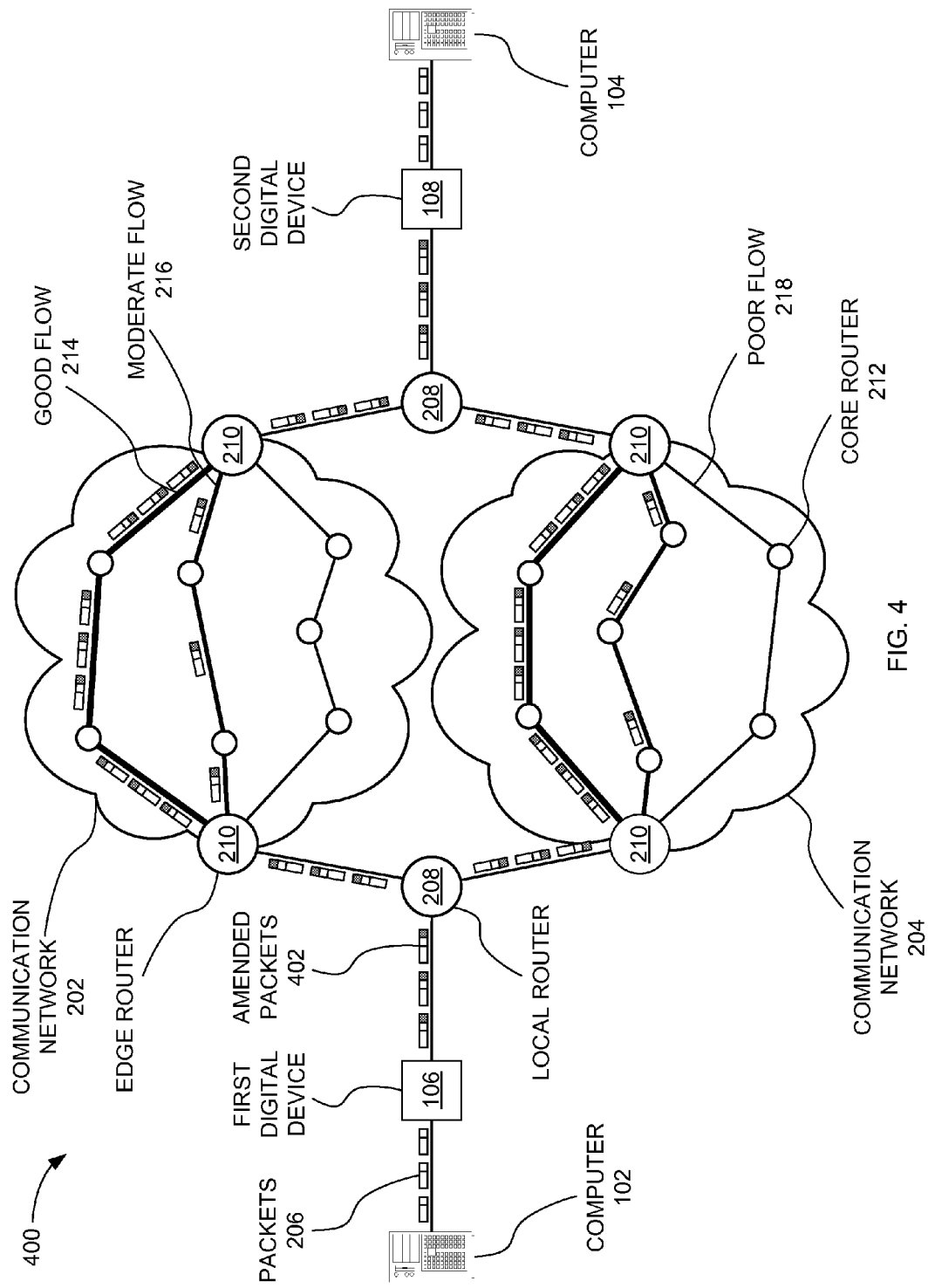
FIG. 4 illustrates an exemplary implementation of quality of service using multiple flows.

FIG. 4 illustrates an exemplary implementation of quality of service using multiple flows. An environment 400, as depicted in FIG. 4, may include certain similar elements as the environment 200 of the prior art, such as the computers 102 and 104, the communication network 202, the communication network 204, as well as the various routers (e.g., the local routers 208, the edge routers 210, and the core routers 212). The environment 400 also includes the first digital device 106, which is positioned between the computer 102 and one of the local routers 208, and the second digital device 108, which is positioned between the computer 104 and the other local router 208.

In some embodiments, the first digital device 106 may amend the packet 206 received from the computer 102 via the inter-computer flows to affect which inter-device flow the packet is directed to, this resulting in an amended packet 402. According to one embodiment, the packet 206 is amended such that an additional header portion is added to the packet 206, while according to another embodiment, the packet 206 is amended such that certain information in the header portion is altered or replaced. The amended packet 402 may be restored to the packet 206 upon receipt by the second digital device 108. After which, the packet 206 may be delivered to the computer 104 on the inter-computer flow from which it originated. Again, it is noted that the first digital device 106 may be equivalent to, and interchangeable with, the second digital device 108 in that any task or procedure carried out by the first digital device 106 may be carried out by the second digital device 108, and vice versa.

As shown in FIG. 4, the amended packets 402 may advantageously be more heavily distributed to the inter-device flows having the preferable flow metrics (e.g., the good flow 214). The moderate flow 216 may transfer less of the amended packets 402, while the poor flow 218 may transfer even fewer. Details concerning amended packets (e.g., the amended packets 402) are discussed in connection with FIG. 9B. Further examples of packet distributions are described in connection with FIG. 8.

Figure 5:
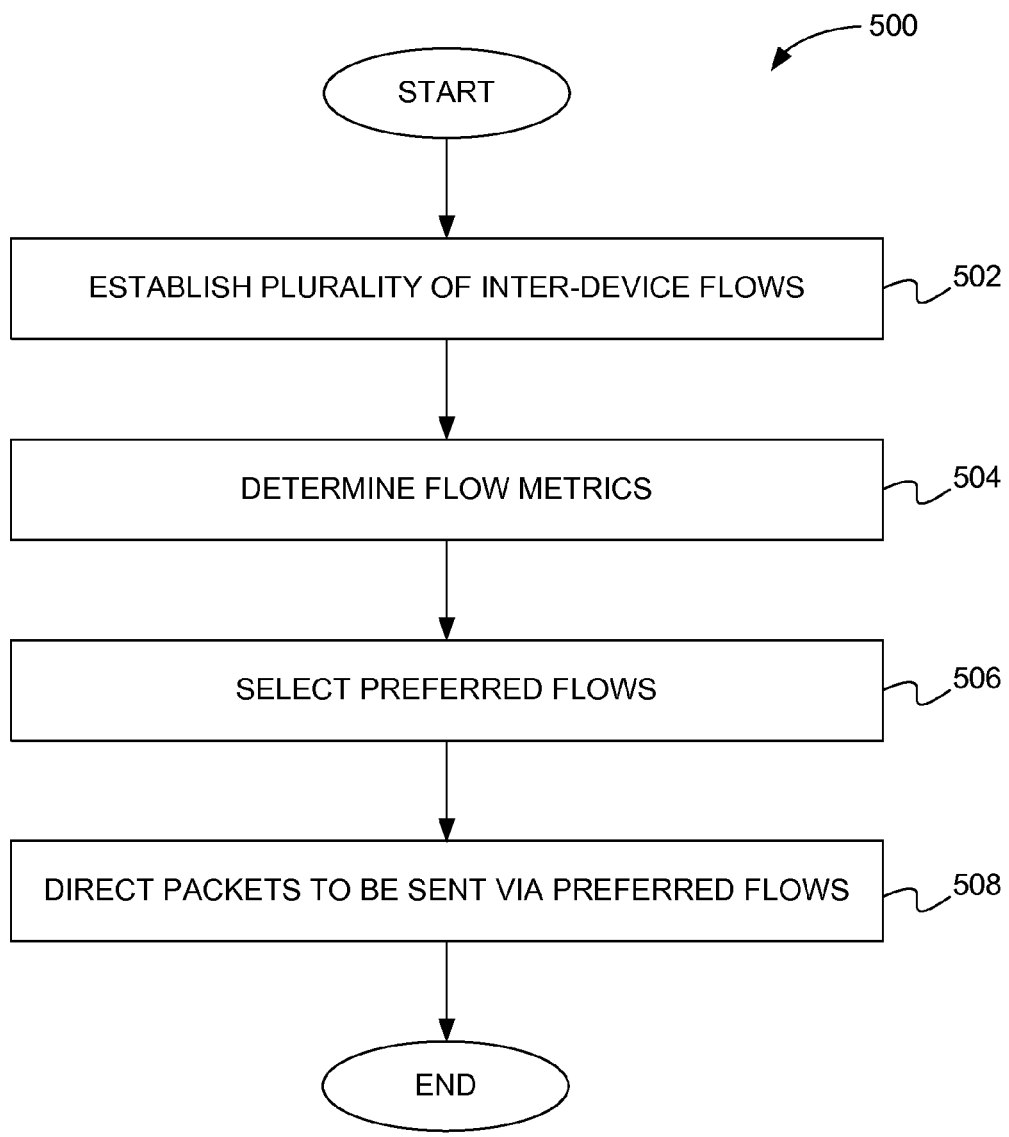
FIG. 5 is a flowchart showing an exemplary process for implementing quality of service using multiple flows.

FIG. 5 is a flowchart 500 showing an exemplary process for implementing quality of service using multiple flows. According to various embodiments, the process may be carried out by the first digital device 106, the second digital device 108, any other digital device, or any combination thereof.

At step 502, the plurality of inter-device flows is established. The plurality of inter-device flows (e.g., the flows 302A-302N) may be established, for example, between two or more digital devices (e.g., the first digital device 106 and the second digital device 108), between two or more computers (e.g., the computer 102 and the computer 104), between various other communication network components across the communication network (e.g., the communication network 110), or any combination thereof (e.g., between the first digital device 106 and the local router 208 via the communication network 202). The plurality of inter-device flows may be established by methods known in the art.

At step 504, the flow metrics are determined. As mentioned, the flow metrics may include the latency metric, the re-ordering metric, and/or the loss metric. Exemplary determinations of the flow metrics are discussed in detail in connection with FIG. 6 and FIG. 7.

At step 506, preferred flows are selected. The preferred flows may be selected based on classifications of the inter-device flows according to the flow metrics. Other considerations may also affect selecting the preferred flow. For example, certain monetary considerations described in connection with FIG. 8 may affect the selection.

At step 508, the packets are directed to be sent via the preferred flows determined in step 506. In some embodiments, the packets may be directed according to information contained in their respective header portions. The packets may be directed based on the flow metrics without regard to various communication network protocols in accordance with exemplary embodiments.

The flowchart 500 of FIG. 5 is exemplary. The steps 504-508 may be repetitive. For example, the flow metrics may be determined and/or updated in an iterative fashion (e.g., periodically). Updated flow metrics may then affect which inter-device flows are currently preferred, and the packets may be redirected based on currently preferred flows. Furthermore, some inter-device flows may be terminated based on the flow metrics (e.g., the poor flow 218) and new inter-device flows be established to replace terminated inter-device flows.

Figure 6:
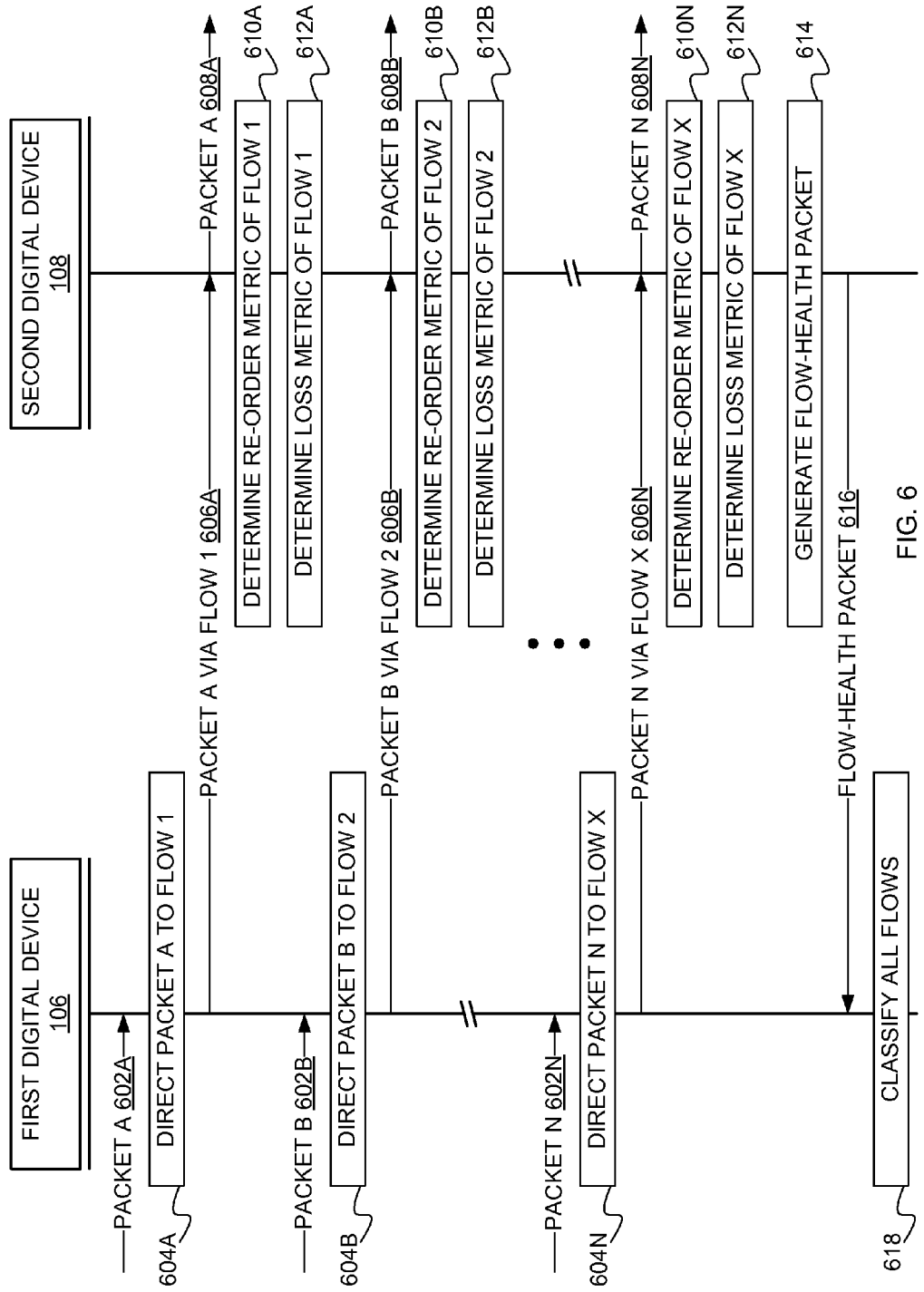
FIG. 6 is a message sequence chart for determining various flow metrics in order to classify the inter-device flows, according to various embodiments.

FIG. 6 is a message sequence chart for determining various flow metrics in order to classify the inter-device flows, according to various embodiments. As depicted, the message sequence illustrated in FIG. 6 may be implemented by any system comprising, or equivalent to, the first digital device 106 and the second digital device 108 to determine the re-ordering metrics and the loss metrics of flows 1-X established between the first digital device 106 and the second digital device 108. However, in some embodiments, the message sequence illustrated in FIG. 6 may be implemented to determine other flow metrics (e.g., the latency metric). In this example, the first digital device 106 receives or intercepts packets A-N from a given computer (e.g., the computer 102) in transmissions 602A-602N, respectively.

In sequence 604A, the packet A is directed to flow 1. It is noted that any packet may be directed to any inter-device flow. Directing the packet A to flow 1 may be based, in part, on previously determined flow metrics. In the case where flow 1 is initially being established or has recently been established, directing the packet A to flow 1 may be random. According to some embodiments, the sequence 604A may comprise amending the packet A, which is described further in connection with FIG. 9A and FIG. 9B. Sequences 604B-604N may each be similar to the sequence 604A as related to packets B-N and flows 2-X, respectively. Subsequent to each of the sequences 604A-604N, the packets A-N are sent to the second digital device 108 via flows 1-X in transmissions 606A-606N, respectively.

In sequence 610A, a re-order metric of flow 1 is determined at the second digital device. The re-order metric of flow 1 may indicate a level of re-ordering required when packets arrive at the second digital device via flow 1. According to various embodiments, the re-ordering metric of flow 1 may be determined, in part, from information contained in a header portion (e.g., a sequence number) of packets sent via flow 1. Sequences 610B-610N may each be similar to the sequence 604A as related to flows 2-X, respectively.

In sequence 612A, a loss metric of flow 1 is determined at the second digital device 108. The loss metric of flow 1 may indicate probability that packets sent via flow 1 will fail to reach the second digital device 108. According to various embodiments, the loss metric of flow 1 may be determined, in part, from information contained in the header portion of packets sent via flow 1, such as the sequence number. Sequences 612B-612N may each be similar to the sequence 612A as related flows 2-X, respectively. In addition, the packets A-N may be sent from the second digital device 108, for example, to the computer 104 prior to, concurrent with, or subsequent to the sequences 610A-610N and 612A-612N in transmissions 608A-608N, respectively.

In sequence 614, a flow-health packet is generated at the second digital device 108. According to various embodiments, the flow-health packet 616 may summarize the flow metrics (e.g., the re-order metric and the loss metric) of one or more of flows 1-X. In some embodiments, multiple flow-health packets may be generated. The flow-health packet 616 may, for example, be stored temporarily or permanently, and may be used in calculating statistics related to flows 1-X. The flow-health packet 616 is subsequently sent to the first digital device 106 via one of flows 1-X. Flow-health packets may be sent at any time, for example, periodically (e.g., every five minutes) or after a certain number of packets are received by the second digital device 108 since a previous flow-health packet was sent, in accordance with some embodiments.

In sequence 618, all inter-device flows (e.g., flows 1-X) are classified at the first digital device 106. In one embodiment, the classification is based on the flow-health packet 616 received from the second digital device 108. In some embodiments, pre-existing classifications may be updated based on the flow-health packet 616. Classifications of flows 1-X may affect how the packets are directed to inter-device flows, for example, in the sequences 604A-604N.

Figure 7:
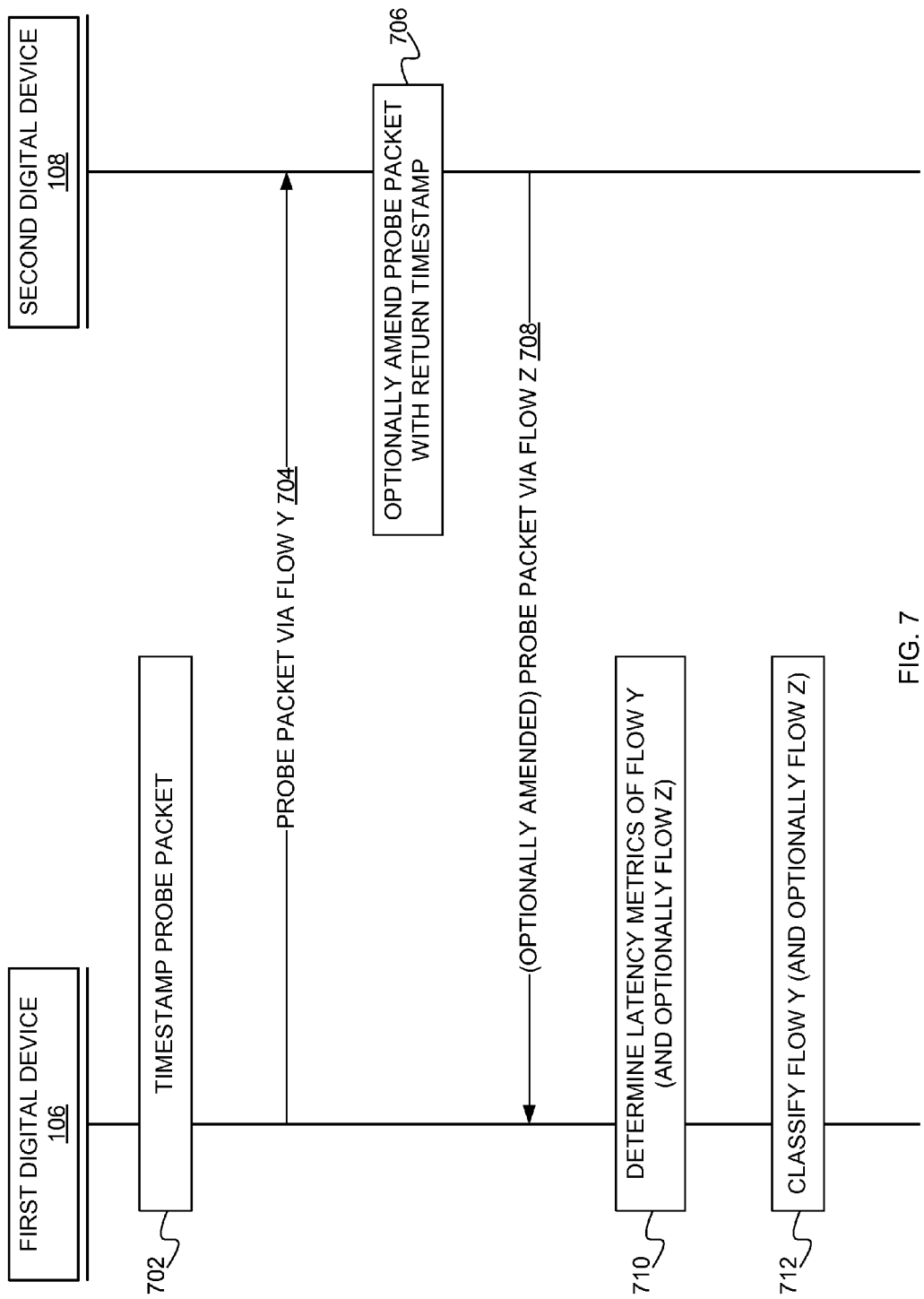
FIG. 7 is an exemplary message sequence chart for determining another flow metric in order to classify the inter-device flows.

FIG. 7 is an exemplary message sequence chart for determining another flow metric in order to classify inter-device flows. As depicted, the message sequence illustrated in FIG. 7 may be implemented by any system comprising, or equivalent to, the first digital device 106 and the second digital device 108 to determine the latency metric of a flow Y established between the first digital device 106 and the second digital device 108. However, in some embodiments, the message sequence illustrated in FIG. 7 may be implemented to determine other flow metrics (e.g., the re-ordering metric and the loss metric). The latency metric may optionally be determined for a flow Z, as described herein. In this example, the first digital device 106 does not necessarily need to receive a packet (e.g., from the computer 102 or the computer 104) in order to determine the latency metric of the flow Y. However, in some embodiments, any packet may be used to probe the latency metric of any inter-device flow. Additionally, flow Y and flow Z may represent any inter-device flow established between the first digital device 106 and the second digital device 108.

In sequence 702, a probe packet is generated at the first digital device 106. The probe packet may be similar to other packets, but may contain limited information, for example, to minimize traffic over the communication network. The probe packet may contain a timestamp indicating a time when the probe packet is sent via the flow Y to the second digital device 108 in transmission 704.

In sequence 706, the second digital device 108 may optionally amend the probe packet with a return timestamp. In any case, the probe packet may be returned to the first digital device 106 via the flow Z in transmission 708. It is noted that the flow Z may or may not be one and the same as the flow Y. Furthermore, the fact that the flow Z is or is not one and the same as the flow Y may be either predetermined or happenstance, in accordance with various embodiments.

In sequence 710, the latency metric of the flow Y is determined at the first digital device 106 based, in part, on the probe packet received from the second digital device 108. If the latency metric for the flow Y was previously known, the probe packet may be used in updating the latency metric. Also, the latency metric of flow Z may optionally be determined, for example, if the return timestamp was included by the second digital device 108 in the sequence 706. In sequence 712, flow Y and optionally flow Z may be classified. Those skilled in the art will appreciate that the latency metric of the flow Y may be determined independent of any knowledge of the processing delay, the queuing delay, the transmission delay, and/or the propagation delay associated with the flow Y. Furthermore, it will be recognized that the message sequence illustrated in FIG. 7 is exemplary and may be applied to any or all inter-device flows to determine various flow metrics.

Figure 8:
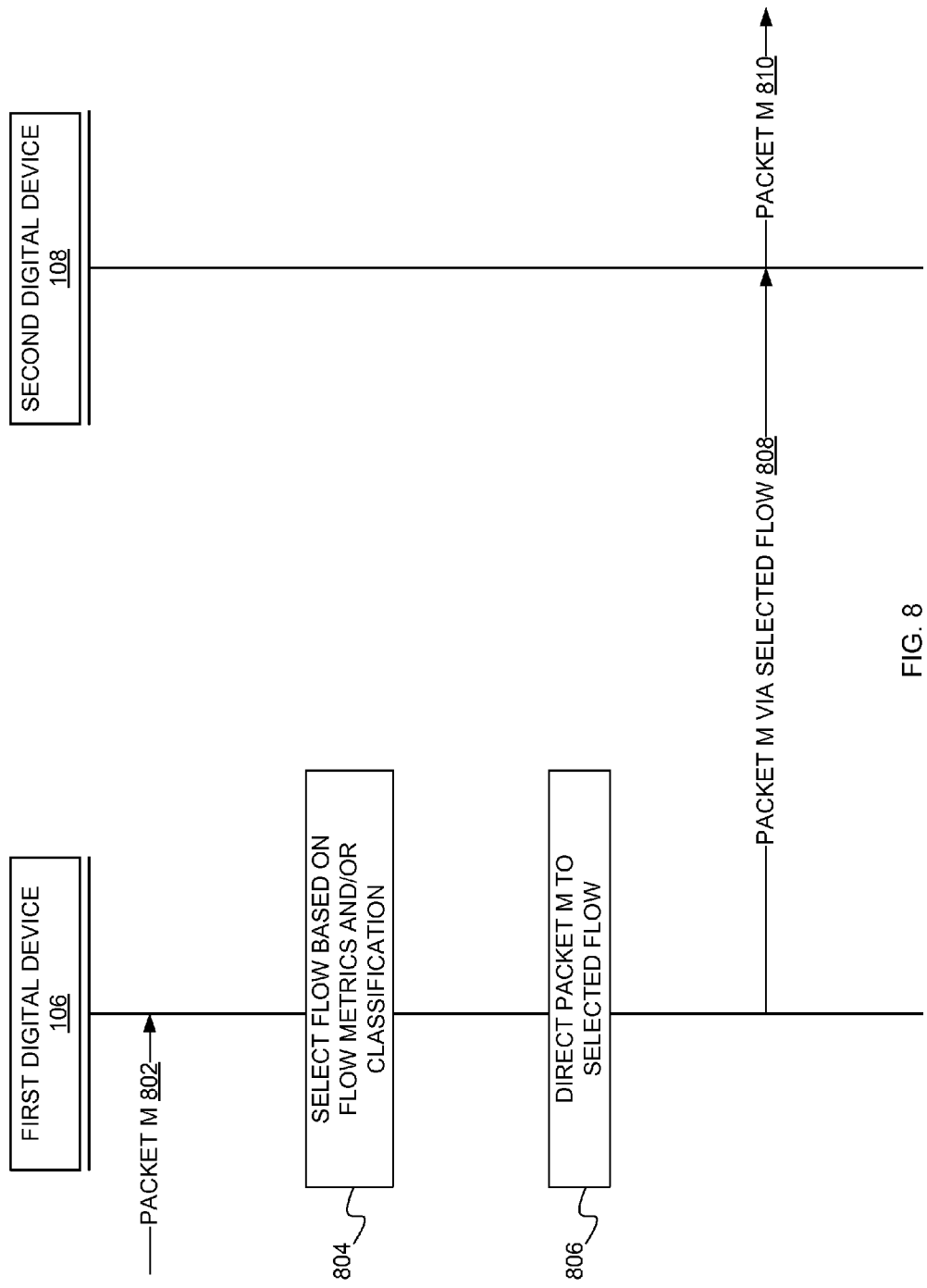
FIG. 8 is a message sequence chart for directing packets from the inter-computer flows to the inter-device flows based on various flow metrics and/or a flow classification, in accordance with various embodiments.

FIG. 8 is a message sequence chart for directing packets from the inter-computer flows to the inter-device flows based on the various flow metrics and/or a flow classification, in accordance with various embodiments. As depicted, the message sequence illustrated in FIG. 8 may be implemented by any system comprising, or equivalent to, the first digital device 106 and the second digital device 108. In the present embodiment, the first digital device 106 receives or intercepts a packet M from a given computer (e.g., the computer 102) in transmission 802 via the inter-computer flows.

In sequence 804, a specific inter-device flow may be selected based on the flow metrics and/or classification associated with that inter-device flow. Many considerations may be taken into account in directing the packets to the inter-device flows. For example, the inter-device flows may be selected based on a combination of the flow metrics, the classification of the inter-device flow, characteristics of the packet to be directed, other considerations, or any combination thereof.

According to one embodiment, transfer speed may be critical, while packet loss and re-ordering may be secondary considerations. In turn, the packets may be directed to the inter-device flows having the most preferred latency metrics, regardless of the loss metrics and re-ordering metrics associated with the inter-device flows. Similar reasoning may apply to cases where other flow metrics are essential, for example, when all packets must be received regardless of the transfer speed or re-ordering.

In other embodiments, the inter-device flows may be classified such that selecting an inter-device flow in the sequence 804 may comprise determining which flow classification is appropriate for a given packet to be directed to and then selecting some inter-device flow having that classification. In one example, some packets may be more critical that others, and therefore may be directed to inter-device flows having the classification that is appropriate for requirements of the packets. As one skilled in the art will appreciate, the packets may be identified according to various factors, such as content of the packet, quality of service marking, associated application type, etc.

Overall flow efficiency may be of chief importance in another example, where the distribution of the packets directed to the inter-device flows may be optimized solely for transfer efficiency. To illustrate, inter-device flows classified as good (e.g., the good flow 214) may be used at a certain capacity and inter-device flows classified as moderate (e.g., the moderate flow 216) may be used at another capacity, such that an optimal rate of overall packet transfer is achieved.

Monetary considerations may be paramount according to some embodiments. For example, two classifications of flows may be available from a service provider (e.g., gold flows and silver flows). The gold flows may cost more than the silver flows and generally be considered to display superior performance. By determining the flow metrics of the gold flows and the silver flows that are established between the first digital device 106 and the second digital device 108, it may be concluded that some of the silver flows actually perform as well as the gold flows. In such a case, gold-like performance may be obtained at silver-like costs by directing packets to outperforming silver flows. Alternatively, it may be concluded that some gold flows are underperforming based on the flow metrics. In turn, packets may be directed away from underperforming gold flows.

The flow metrics of a given flow may change over time, which may require the inter-device flows to be reclassified. In one example where a certain inter-device flow is persistently bad, the certain inter-device flow may be dropped, and a new inter-device flow may be established as a replacement.

In sequence 806, the packet M is directed to the inter-device flow selected in the sequence 804. Upon arrival at the second digital device 108 by transmission 808, the packet M may be passed on to a computer (e.g., the computer 104) in transmission 810. In some embodiments, the packet M may be used to determine the various flow metrics, such as described in FIG. 6 and FIG. 7. In addition, those skilled in the art will recognize that the message sequence illustrated in FIG. 8 is exemplary and other message sequences may be used in directing various packets to various inter-device flows.

Figure 9A:
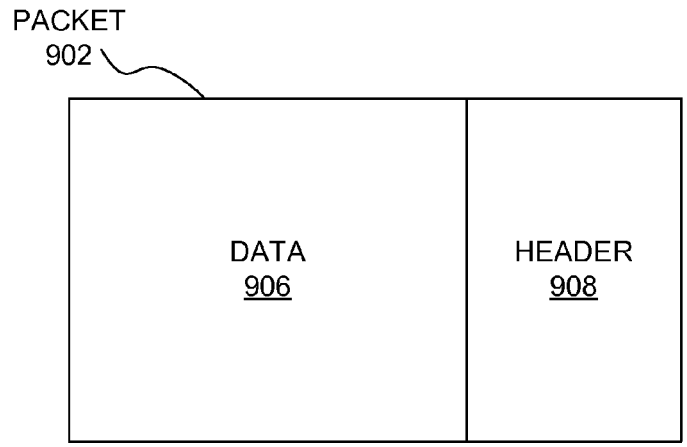
FIGS. 9A and 9B are exemplary illustrations of a packet and an amended packet, respectively.
Figure 9B:
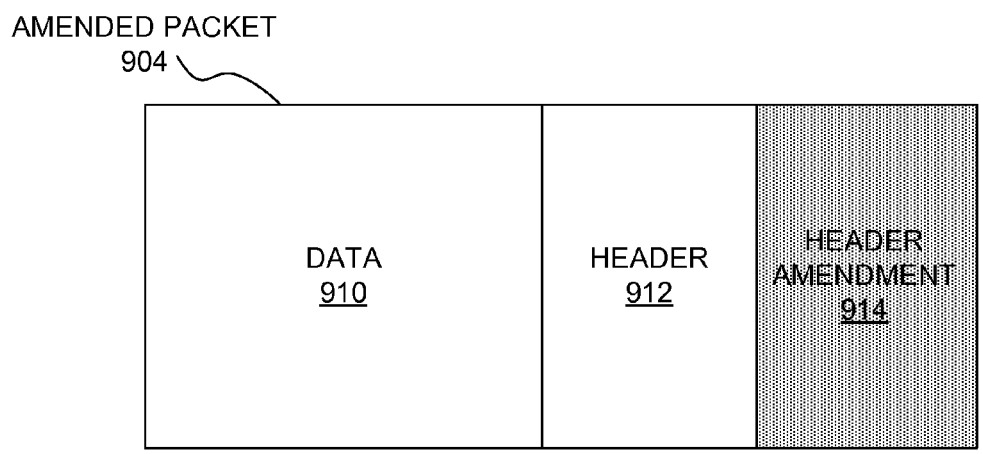

FIG. 9A and FIG. 9B are exemplary illustrations of a packet 902 and an amended packet 904, respectively. The packet 902 may comprise a data portion 906 and a header portion 908. The data portion 906 may comprise information to be transferred from one location to another via the communication network (e.g., emails, documents, database entries, etc., and parts thereof). According to various embodiments, the header portion 908 may comprise IP addresses of a sender and a recipient (e.g., the computer 102 and the computer 104) and a protocol governing a format of the data portion 906. Contents of the header portion 908 may be specified by a protocol of the communication network. For example, transmission control protocol (TCP) may specify the header portion 908 to include a source port, a destination port, a sequence number, an acknowledgement number, and various flags.

In one embodiment, the amended packet 904 may be generated by the digital devices (e.g., the digital device 106 and the digital device 108) by amending the packet 902. As such, the amended packet 904 may also comprise a data portion 910 that may be similar to the data portion 904 of the packet 902. The amended packet 904, as depicted, further comprises a header portion 912 that may be similar to the header portion 906 of the packet 902 and a header amendment portion 914. In some embodiments, the header portion 912 may be combined with, or otherwise comprise, the header amendment portion 914. The header amendment portion 914 may determine which inter-device flow the amended packet 904 is to be directed to.

Figure 10:
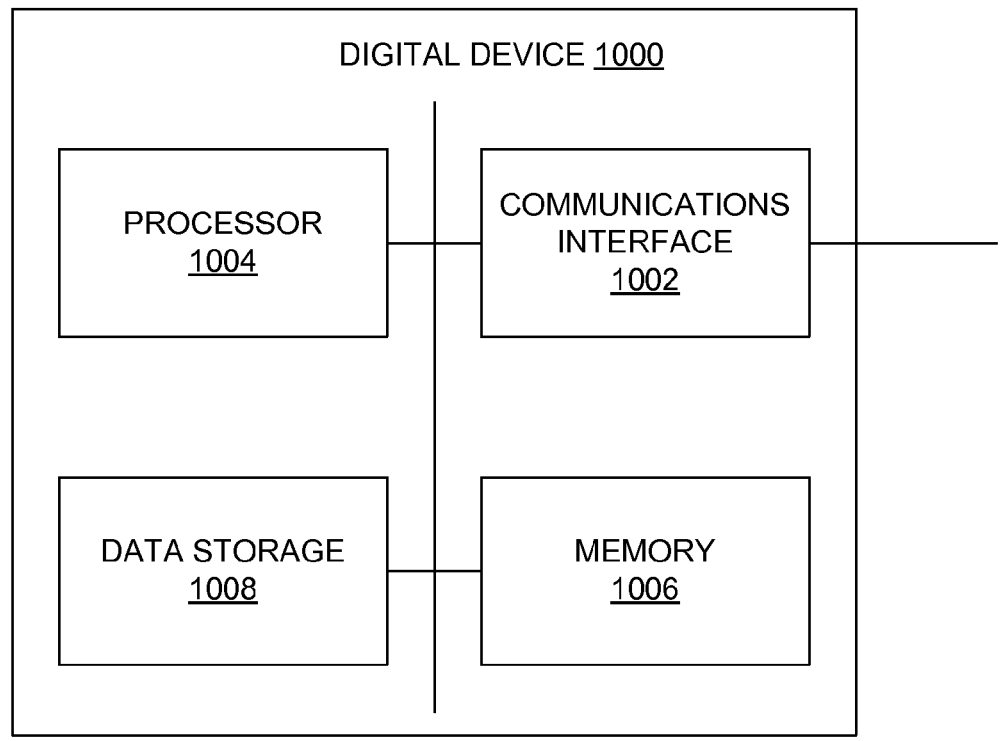
FIG. 10 illustrates an exemplary digital device.

FIG. 10 illustrates an exemplary digital device 1000 (e.g., the digital device 106 and the digital device 108). The digital device 1000 may comprise a standalone hardware device or be integrated with another hardware device (e.g., a computer or a router) as a single system. The digital device 1000 may comprise a communications interface 1002, a processor 1004, a memory 1006, and a data storage 1008, which are all in communication with each other (e.g., via a bus). In some embodiments, the digital device 1000 may comprise more than one communication interface 1002. Although the digital device 1000 is depicted as including various components, the digital device 1000 may comprise more or less components and still fall within the scope of the present invention.

The memory 1006 may comprise volatile memory to temporarily store packets (such as the packets 206 and the amended packets 402) and information related to the flow metrics. The memory 1006 typically comprises random-access memory (RAM).

The data storage 1008 comprises non-volatile memory to persistently store data such that the response data stored in the data storage 1008 can be retrieved later. The data storage 1008 may comprise magnetic media such as a disk-drive and/or the like.

Further, a database may comprise hardware and/or software elements configured to store data in an organized format. The database may organize the data to enable the classification of various established inter-device flows and to enable quick retrieval of information related to the flow metrics. In one example, the database is distributed (e.g., shared among two or more digital devices over the communication network). Data may be located or identified at a specific location (i.e., address) within the database. Similarly, the physical location of the data (e.g., the location of the data within the data storage 1008) may be identified within the database.

The hardware and/or software elements of the database may include storage devices, such as RAM, hard drives, optical drives, flash memory, and magnetic tape. In one example, the database may be stored within the data storage 1008 and/or memory 1006. In another example, the database is shared among a plurality of appliances (e.g., within a plurality of data storages 1008 and/or memories 1006).

It will be appreciated that the communications interface 1002 may be coupled to any kind of communication network. In one example, the communications interface 1002 is coupled to a local area communication network. In another example, the communications interface 1002 is coupled to a wide area communication network. Furthermore, there may be any number of communications interfaces.

The above-described components and functions can be comprised of instructions that are stored on a computer-readable storage medium. The instructions can be retrieved and executed by a processor (e.g., the processor 1004). Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
    establishing by a first digital device, a plurality of inter-computer flows between the first digital device and a computer;
    establishing by a first digital device, a plurality of inter-device flows between the first digital device and a second digital device, the first digital device in communication with the second digital device via a communication network, the first digital device and the second digital device overriding influence associated with transferring packets across the communication network, the first digital device and the second digital device being only concerned with the plurality of inter-device flows themselves;
    receiving a data packet at the first digital device via at least one of the plurality of inter-computer flows;
    determining at least one flow metric associated with each of the plurality of inter-device flows, wherein the at least one flow metric is iteratively determined;
    classifying each of the plurality of inter-device flows based at least in part on the at least one flow metric;
    selecting a preferred inter-device flow from the plurality of inter-device flows based at least in part on the classification of the inter-device flows;
    amending header information on the data packet based at least in part on the selected preferred inter-device flow;
    directing the amended data packet to be sent by the first digital device to the second digital device via the selected preferred inter-device flow;
    updating the at least one flow metric based at least in part on the directed amended packet sent by the first digital device to the second digital device via the selected preferred inter-device flow; and
    updating the classification of each of the plurality of inter-device flows based at least in part on the updated at least one flow metric.

2. The method of claim 1, further comprising:
    receiving the amended data packet at the second digital device; and restoring the data packet header to its original form as received by the first digital device.

3. The method of claim 1, wherein the selecting preferred inter-device flows from the plurality of inter-device flows is further based on characteristics of the data packet to be directed.

4. The method of claim 1, wherein determining the flow metrics comprises receiving one or more flow-health packets from the second digital device.

5. The method of claim 1, wherein the flow metrics are determined, at least in part, from previously directed packets and previously received packets.

6. The method of claim 1, wherein the flow metrics comprise a latency metric.

7. The method of claim 1, wherein the flow metrics comprise a loss metric.

8. The method of claim 1, wherein the flow metrics comprise a reordering metric.

9. The method of claim 1, wherein the first digital device is a network memory digital device, a router, or a computer.

10. A system comprising:
    a first digital device configured to:
        establish a plurality of inter-computer flows between the first digital device and a computer;
        establish a plurality of inter-device flows between the first digital device and a second digital device, the first digital device in communication with the second digital device via a communication network, the first digital device and the second digital device overriding influence associated with transferring packets across the communication network, the first digital device and the second digital device being only concerned with the plurality of inter-device flows themselves;
        receive a data packet at the first digital device via at least one of the plurality of inter computer flows;
        determine at least one flow metric associated with each of the plurality of inter-device flows, wherein the at least one flow metric is iteratively determined;
        classify each of the plurality of inter-device flows based at least in part on the at least one flow metric;
        select a preferred inter-device flow from the plurality of inter-device flows based at least in part on the classification of the inter-device flows;
        amend header information on the data packet based at least in part on the selected preferred inter-device flow;
        direct the amended data packet to be sent by the first digital device to the second digital device via the selected preferred inter-device flow;
        update the at least one flow metric based at least in part on the directed amended packet sent by the first digital device to the second digital device via the selected preferred inter-device flow; and
        update the classification of each of the plurality of inter-device flows based at least in part on the updated at least one flow metric.

11. The system of claim 10, wherein the second digital device is further configured to receive the amended data packet, and restore the data packet to its original form as received by the first digital device.

12. The system of claim 10, wherein the first digital device is further configured to select preferred inter-device flows from the plurality of inter-device flows based at least in part on characteristics of the data packet to be directed.

13. The system of claim 10, wherein the first digital device is further configured to determine the flow metrics, in part, by receiving one or more flow-health packets from the second digital device.

14. A non-transitory computer readable storage medium having embodied thereon a program, the program being executable by a processor for performing a method, the method comprising:
    at a first digital device:
        establishing by the first digital device, a plurality of inter-computer flows between the first digital device and a computer;
        establishing by the first digital device, a plurality of inter-device flows between the first digital device and a second digital device, the first digital device in communication with the second digital device via a communication network, the first digital device and the second digital device overriding influence associated with transferring packets across the communication network, the first digital device and the second digital device being only concerned with the plurality of inter-device flows themselves;

receiving a data packet at the first digital device via at least one of the plurality of inter-computer flows;

determining at least one flow metric associated with each of the plurality of inter-device flows, wherein the at least one flow metric is iteratively determined;

classifying each of the plurality of inter-device flows based at least in part on the at least one flow metric;

selecting a preferred inter-device flow from the plurality of inter-device flows based at least in part on the classification of the inter-device flows;

amending header information on the data packet based at least in part on the selected preferred inter-device flow;

directing the amended data packet to be sent by the first digital device to the second digital device via the selected preferred inter-device flow;

updating the at least one flow metric based at least in part on the directed amended packet sent by the first digital device to the second digital device via the selected preferred inter-device flow; and updating the classification of each of the plurality of inter-device flows based at least in part on the updated at least one flow metric.

* * * * *